US010187420B2

(12) United States Patent
    Pate (10) Patent No.: US 10,187,420 B2
(45) Date of Patent: *Jan. 22, 2019

(54) LOCAL APPLICATIONS AND LOCAL APPLICATION DISTRIBUTION

(71) Applicant: AT&T Intellectual Property I, L.P., Atlanta, GA (US)

(72) Inventor: Eric Pate, Cumming, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/722,210

(22) Filed: Oct. 2, 2017

(65) Prior Publication Data

US 2018/0027011 A1    Jan. 25, 2018

Related U.S. Application Data

(63) Continuation of application No. 14/501,963, filed on Sep. 30, 2014, now Pat. No. 9,781,153.

(51) Int. Cl.
    *H04L 29/06*  (2006.01)
    *H04L 29/08*  (2006.01)
    *H04W 12/06*  (2009.01)

(52) U.S. Cl.
    CPC .......... *H04L 63/1441* (2013.01); *H04L 63/10* (2013.01); *H04L 63/107* (2013.01);
    (Continued)

(58) Field of Classification Search
    CPC .......... G06F 11/00; G06F 12/14; G06F 12/16; G08B 23/00; H04L 63/10; H04L 63/107;
    (Continued)

(56) References Cited

U.S. PATENT DOCUMENTS 5,916,306 A    6/1999  Ruiz
6,202,023 B1*  3/2001  Hancock ............... G01C 21/20
                                                 701/516
(Continued)

FOREIGN PATENT DOCUMENTS

WO    WO 2012032137    3/2012
WO    WO 2014043818    3/2014

OTHER PUBLICATIONS

Evans et al., "An Intelligent Mobile Advertising System (iMAS): Location-Based Advertising to Individuals and Business," 2012 Sixth International Conference on Complex, Intelligent and Software Intensive Systems, Jul. 4-6, 2012, pp. 959-964.

(Continued)

*Primary Examiner* — Jayesh M Jhaveri
(74) *Attorney, Agent, or Firm* — Hartman & Citrin LLC (57) ABSTRACT

Concepts and technologies are disclosed herein for local applications and local application distribution. According to one aspect of the concepts and technologies disclosed herein, an application authority system can receive a local application for distribution to a local router. The application authority system can perform an application approval process to approve the local application for distribution to the local router. The application authority system can cause the local application to be distributed to the local router. The local router can receive the local application and can distribute the local application to one or more devices via a local network.

20 Claims, 8 Drawing Sheets

(52) U.S. Cl.
CPC .............. *H04L 67/18* (2013.01); *H04L 67/34* (2013.01); *H04W 12/06* (2013.01); *H04L 67/10* (2013.01); *H04L 67/12* (2013.01); *H04L 67/125* (2013.01)

(58) Field of Classification Search
CPC ......... H04L 67/10; H04L 67/18; H04L 67/12; H04L 67/125; H04L 67/34; H04L 29/06; H04L 29/08; H04W 12/06
See application file for complete search history.

(56) References Cited

U.S. PATENT DOCUMENTS

| | | | |
|---|---|---|---|
| 8,566,839 | B2 | 10/2013 | Johnson et al. |
| 8,589,245 | B2 | 11/2013 | Michaelis et al. |
| 9,674,658 | B2* | 6/2017 | Partheesh ............. H04W 4/021 |
| 9,894,099 | B1* | 2/2018 | Jacobsen ................. H04L 63/20 |
| 2002/0091568 | A1 | 7/2002 | Kraft et al. |
| 2002/0129170 | A1 | 9/2002 | Moore |
| 2002/0161633 | A1 | 10/2002 | Jacob et al. |
| 2004/0078708 | A1 | 4/2004 | Li |
| 2004/0242209 | A1* | 12/2004 | Kruis ...................... H04W 4/24 455/414.1 |
| 2004/0254993 | A1 | 12/2004 | Mamas |
| 2005/0221843 | A1 | 10/2005 | Friedman et al. |
| 2006/0064346 | A1 | 3/2006 | Steenstra et al. |
| 2008/0279197 | A1* | 11/2008 | Faisal ..................... H04L 45/00 370/396 |
| 2009/0029721 | A1 | 1/2009 | Doraswamy |
| 2009/0278479 | A1* | 11/2009 | Platner ............... H05B 37/0245 315/312 |
| 2010/0138294 | A1 | 6/2010 | Bussmann et al. |
| 2011/0208797 | A1 | 8/2011 | Kim |
| 2011/0214184 | A1* | 9/2011 | Whitehouse ............ G06F 21/53 726/24 |
| 2012/0059741 | A1 | 3/2012 | Khan et al. |
| 2012/0172027 | A1 | 7/2012 | Partheesh et al. |
| 2012/0209657 | A1 | 8/2012 | Connolly |
| 2012/0209781 | A1* | 8/2012 | Michaelis ............. G06Q 30/02 705/304 |
| 2012/0278454 | A1* | 11/2012 | Stewart ................... H04L 67/34 709/220 |
| 2012/0311659 | A1 | 12/2012 | Narain |
| 2013/0085866 | A1 | 4/2013 | Levitis et al. |
| 2013/0179263 | A1 | 7/2013 | Leebow |
| 2013/0281017 | A1 | 10/2013 | Bondensen et al. |
| 2013/0329888 | A1 | 12/2013 | Alrabady et al. |
| 2014/0007222 | A1 | 1/2014 | Qureshi |
| 2014/0114778 | A1 | 4/2014 | Miller et al. |
| 2014/0162692 | A1 | 6/2014 | Li et al. |
| 2014/0171116 | A1 | 6/2014 | LaMarca et al. |
| 2014/0188614 | A1 | 7/2014 | Badenhop |
| 2014/0337528 | A1 | 11/2014 | Barton |
| 2014/0370879 | A1 | 12/2014 | Redding |
| 2015/0085111 | A1* | 3/2015 | Lavery ............. H04N 21/21805 348/143 |
| 2015/0141005 | A1 | 5/2015 | Suryavanshi |
| 2015/0198938 | A1* | 7/2015 | Steele .................... G05B 15/02 700/275 |

OTHER PUBLICATIONS

Kaur, Kamal, "Location-based advertising bridges online and physical retail," Mobile Marketer, Jan. 9, 2014.
Man et al., "Energy-efficient automatic location-triggered applications on smartphones," Computer Communications, Sep. 1, 2011, vol. 50, pp. 29-40.
Rao et al., "Evolution of mobile location-based services," Communications of the ACM, Dec. 2003, vol. 46, Issue 12, pp. 61-65.
Paruchuri et al., "Context Aware Identity Management Using Smart Phones," 2013 Eighth International Conference on Broadband and Wireless Computing, Communication and Applications, Oct. 28-30, 2013, pp. 184-190.
Li et al., "Building a targeted mobile advertising system for location-based services," Decision Support Systems, Dec. 2012, vol. 54, Issue 1, pp. 1-8.
"McDonald's testing mobile ordering app," New York Daily News, Sep. 16, 2013, http://www.nydailynews.com/life-style/eats/mcdonald-tests-mobile-ordering-app-article-1.1457588.
Bruner et al., "Attitude Toward Location-based Advertising," Journal of Interactive Advertising, 2007, vol. 7, Issue 2, pp. 3-15.
Bray, Hiawatha, "How Location-Based Apps Will Shape the Future of Shopping," Discover Magazine blog, Apr. 30, 2014, http://blogs.discovermagazine.com/crux/2014/04/30/how-location-based-apps-will-shape-the-future-of-shopping/#.VCg5B_IdWxU.
Banerjee et al., "Mobile Advertising: Does Location Based Advertising Work?," International Journal of Mobile Marketing, Dec. 2008.
Unni et al., "Perceived Effectiveness of Push vs. Pull Mobile Location Based Advertising," Journal of Interactive Advertising, 2007, vol. 7, Issue 2, pp. 28-40.
U.S. Office Action dated Jan. 4, 2016 in U.S. Appl. No. 14/501,963.
U.S. Office Action dated Aug. 4, 2016 in U.S. Appl. No. 14/501,963.
U.S. Office Action dated Feb. 8, 2017 in U.S. Appl. No. 14/501,963.
U.S. Notice of Allowance dated May 18, 2017 in U.S. Appl. No. 14/501,963.

* cited by examiner

LOCAL APPLICATIONS AND LOCAL APPLICATION DISTRIBUTION

CROSS-REFERENCE TO RELATED APPLICATIONS

This application is a continuation of U.S. patent application No. 14/501,963, entitled "Local Applications and Local Application Distribution," filed Sep. 30, 2014, now U.S. Pat. No. 9,781,153, which is incorporated herein by reference in its entirety.

BACKGROUND

Digital distribution of applications for computing devices such as, for example, mobile smartphones, tablets, laptop computers, and desktop computers has become ubiquitous within the last several years. A typical digital distribution model allows users to browse available applications via a virtual store and download applications directly to his or her device via the Internet. Digital distribution models may utilize an application approval process to ensure applications are reliable, free of malicious software, and comply with one or more rules regarding content.

Several applications available today for mobile smartphones are location-aware, meaning that the application utilizes location to provide or enhance some functionality of the smartphone. Location-aware applications may launch automatically in a given location, may prompt a user for log-in information when the user is located within an area associated with the application, may notify the user of promotions such as coupons available in a given location, or otherwise provide or enhance some functionality. For example, when a mobile smartphone is located within a predefined distance from a coffee shop that is associated with a coffee shop application that is installed on the mobile smartphone, the mobile smartphone may notify the user that the coffee shop is nearby and may present one or more promotions such as, for example, coupons, daily specials, and/or the like. Location-aware applications have usability that is limited to certain locations and may not be used often enough to warrant installation, which reduces available device storage capacity and may utilize home screen space that could otherwise be made available for more often used applications.

SUMMARY

Concepts and technologies are disclosed herein for local applications and local application distribution. According to one aspect of the concepts and technologies disclosed herein, an application authority system can receive a local application for distribution to a local router. The local application is only made available within one or more pre-defined locations. In other words, when a device that is capable of using a local app is located within a pre-defined location, the device can download, install, and launch the local app; however, after the device leaves the pre-defined location, the local app is automatically uninstalled and removed from the device. The application authority system can perform an application approval process to approve the local application for distribution to the local router. The application authority system can cause the local application to be distributed to the local router. The local router can receive the local application and can distribute the local application to one or more devices via a local network.

In some embodiments, the application authority system can cause the local application to be distributed to a further local router. The further local router can receive the local application and can distribute the local application to a further device via a further local network.

In some embodiments, the application authority system can receive the local application from an application developer system. The application developer system can be utilized by one or more app developers (e.g., software engineers and/or computer programmers) to develop the local application.

According to another aspect disclosed herein, a local router can receive a local application from an application authority system. The local router can detect a device. The local router can provide the local application to the device for use by the device while the device is located within a local area served by the local router.

In some embodiments, the local application is developed to provide functionality to the device only when the device is located within a local area served by the local router.

In some embodiments, the local router can provide the local application to the device based upon an access control privilege of the device. In these embodiments, the local router can request unique authentication information from the device, and the local router can provide the local application to the device based upon the unique authentication information that identifies the device as having the access control privilege.

In some other embodiments, the local router can provide a first version of the local application to the device and a second version of the local application to a second device. In these embodiments, the first version can provide access to first information and the second version can provide access to second information. For example, an employee might have access to the first version of the local application that provides access to employee-specific information, whereas a customer might have access to the second version of the local application.

In some embodiments, the local router can provide a second local application to a second device. The second device can utilize the second application while the second device is located within the local area served by the local router.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of local applications and local application distribution will be presented.

Figure 1:
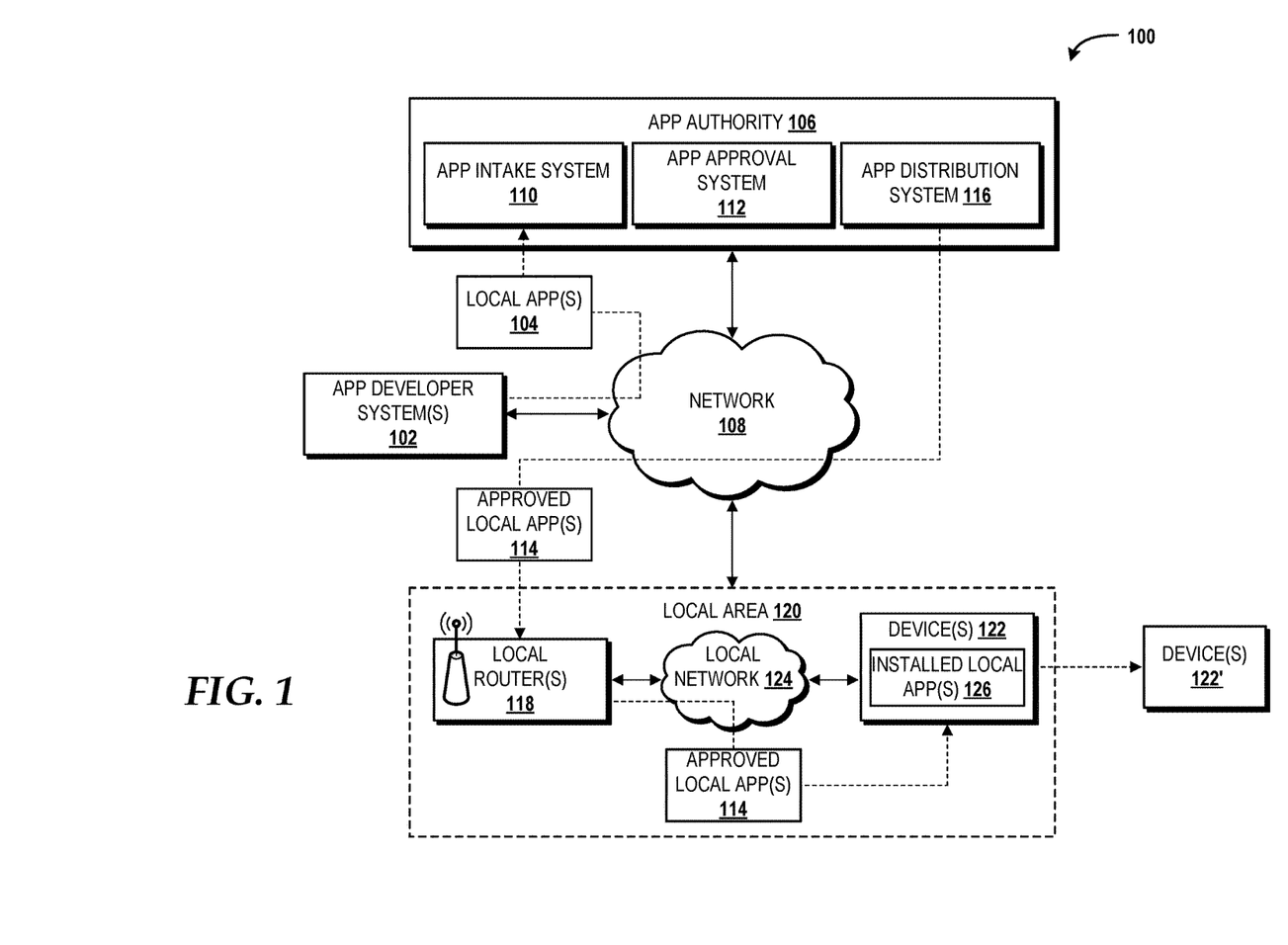
FIG. 1 is a diagram illustrating aspects of an illustrative operating environment for various concepts disclosed herein, according to an illustrative embodiment.

Referring now to FIG. 1, aspects of an operating environment 100 in which various embodiments presented herein may be implemented will be described, according to an illustrative embodiment. The illustrated operating environment 100 includes one or more application developer systems ("app developer system(s)") 102. The app developer system(s) 102 can be utilized by one or more app developers (e.g., software engineers and/or computer programmers) to develop one or more local applications ("local apps") 104. As used herein, a "local app" is an application that is only made available within one or more pre-defined locations. In other words, when a device that is capable of using a local app is located within a pre-defined location, the device can download, install, and launch the local app; however, after the device leaves the pre-defined location, the local app is automatically uninstalled and removed from the device.

The app developer system(s) 102 can be or can include a desktop computer, a laptop computer, a notebook computer, a tablet computer, a netbook computer, a mobile telephone, a mobile smartphone, a mobile feature phone, a video game system, a handheld video game system, a set-top box, a vehicle computing system, a smart watch, a personal fitness tracker, a safety device, a wearable device, a music playback device, a video playback device, an internet appliance, a television, a personal digital assistant ("PDA"), any combination thereof, and/or the like. It should be understood that the functionality of the app developer system(s) 102 can be provided by a single device, by two or more similar devices, and/or by two or more dissimilar devices.

The app developer system(s) 102 can provide one or more software development tools such as, for example, coding tools, compiling tools, testing tools, and the like, which may be included in one or more software development kits ("SDKs"). The software development tools can be used by application developers to create the local app(s) 104 that execute on top of an operating system, some examples of which include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way. Moreover, the local apps 104 may be coded in any programming language, such as, but not limited to, JAVA, C, C++, C#, JAVASCRIPT, or combinations thereof.

The app developer system(s) 102 can provide the local app(s) 104 to an application authority ("app authority") 106 via a network 108. The app authority 106 can receive the local app(s) 104 from the app developer system(s) 102 via an application intake system ("app intake system") 110, which, in turn, can provide the local app(s) 104 to an application approval system ("app approval system") 112. The app approval system 112 can perform one or more app approval processes to ensure the local app(s) 104 are reliable, free of malicious software, and/or comply with one or more rules enforced by the app authority 106. The app approval system 112 can provide one or more approved local apps 114 to an application distribution system ("app distribution system") 116. The app distribution system 116 can distribute, via the network 108, the approved local apps(s) 114 to one or more local routers 118 operating within a local area 120.

The app intake system 110, the app approval system 112, and the app distribution system 116 can be or can include a desktop computer, a laptop computer, a notebook computer, a tablet computer, a netbook computer, a mobile telephone, a mobile smartphone, a mobile feature phone, a video game system, a handheld video game system, a set-top box, a vehicle computing system, a smart watch, a personal fitness tracker, a safety device, a wearable device, a music playback device, a video playback device, an internet appliance, a television, a PDA, any combinations thereof, and/or the like. It should be understood that the functionality of the app intake system 110, the app approval system 112, and the app distribution system 116 can be provided by a single device, by two or more similar devices, and/or by two or more dissimilar devices.

The network 108 can be or can include, for example, one or more wireless wide area networks ("WWANS"), one or more wireless metropolitan area networks ("WMANs"), one or more campus area networks ("CANs"), and/or one or more packet data networks such as the Internet or a portion thereof. The network 108 embodied as a WWAN may use any wireless communications technology or combination of wireless communications technologies, some examples of which include, but are not limited to, WI-FI, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other Institute of Electrical and Electronics Engineers ("IEEE") 802.XX technologies, and the like. The network 108 embodied as a WWAN may operate using various channel access methods (which may or may not be used by the aforementioned technologies), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like. Data may be exchanged via the communications network using cellular data technologies such as, but not limited to, General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies.

The local router(s) 118 can receive the approved local app(s) 114 from the app distribution system 116 via the network 108. The local router(s) 118 can provide the approved local apps(s) 114 to one more devices 122 via a local network 124. The local router(s) 118 can be or can include one or more networking devices that are capable of receiving the approved local app(s) 114 from the network 108 and providing the approved local app(s) 114 to the device(s) 122 via the local network 124. In some embodiments, the local router(s) 118 can be or can include one or more WI-FI routers, one or more small cells (e.g., microcells, picocells, or femtocells), one or more WI-MAX routers, and/or the like. The local network 124 can be or can include, for example, one or more wireless local area networks ("WLAN"), WMANs, WCANs, and/or one or more personal area networks ("PANs"). The local network 124 can operate in accordance with any network technology to facilitate the transfer of the approved local apps 114 from the local router(s) 118 to the device(s) 122. As such, the aforementioned local network types and technologies should not be construed as being limiting in any way.

The device(s) 122 can be or can include a desktop computer, a laptop computer, a notebook computer, a tablet computer, a netbook computer, a mobile telephone, a mobile smartphone, a mobile feature phone, a video game system, a handheld video game system, a set-top box, a vehicle computing system, a smart watch, a personal fitness tracker, a safety device, a wearable device, a music playback device, a video playback device, an internet appliance, a television, a PDA, any combinations thereof, and/or the like. It should be understood that the functionality of each of the devices 122 can be provided by a single device, by two or more similar devices, and/or by two or more dissimilar devices.

The local area 120 can be an indoor area or an outdoor area. For example, an indoor area might be a building (e.g., a restaurant or store), a temporary structure such as a tent, or an area within a building or temporary structure (e.g., a conference room). An outdoor area might be a park, a parking lot, or any other outdoor area. It should be understood that the local area 120 can have any dimensions and is not restricted to areas that may be purely defined as indoor or outdoor but might instead include a combination of indoor and outdoor areas. The local area 120 may be defined, at least in part, by the range of the local network 124.

When the device(s) 122 arrive within the local area 120, the local router(s) 118 can detect the device(s) 122 and can provide the approved local app(s) 114 to the device(s) 122. The device(s) 122 can receive the approved local app(s) 114 and can install the approved local app(s) 114 (shown as installed local app(s) 126). When the device(s) 122 leave the local area 120 (shown as the device(s) 122'), the device(s) 122 can uninstall the installed local app(s) 126 and can remove the installed local app(s) 126.

In some embodiments, the local router(s) 118 can control access to one or more of the approved local app(s) 114. In these embodiments, the local router(s) 118 can request unique authentication information from the device(s) 122 and can use the unique authentication information to determine whether the device(s) 122 should receive the approved local app(s) 114. The unique authentication information can include username, password, media access control ("MAC") address, Internet protocol ("IP") address, or any other identifier that can uniquely identify each of the device(s) 122 and an associated user. In this manner, the local router(s) 118 can distribute the approved local apps 114 based upon access privileges. For example, an employee might have access to a first local app or a first version of a local app that provides access to employee-specific information, whereas a customer might have access to a second local app or a second version of a local app.

Figure 2:
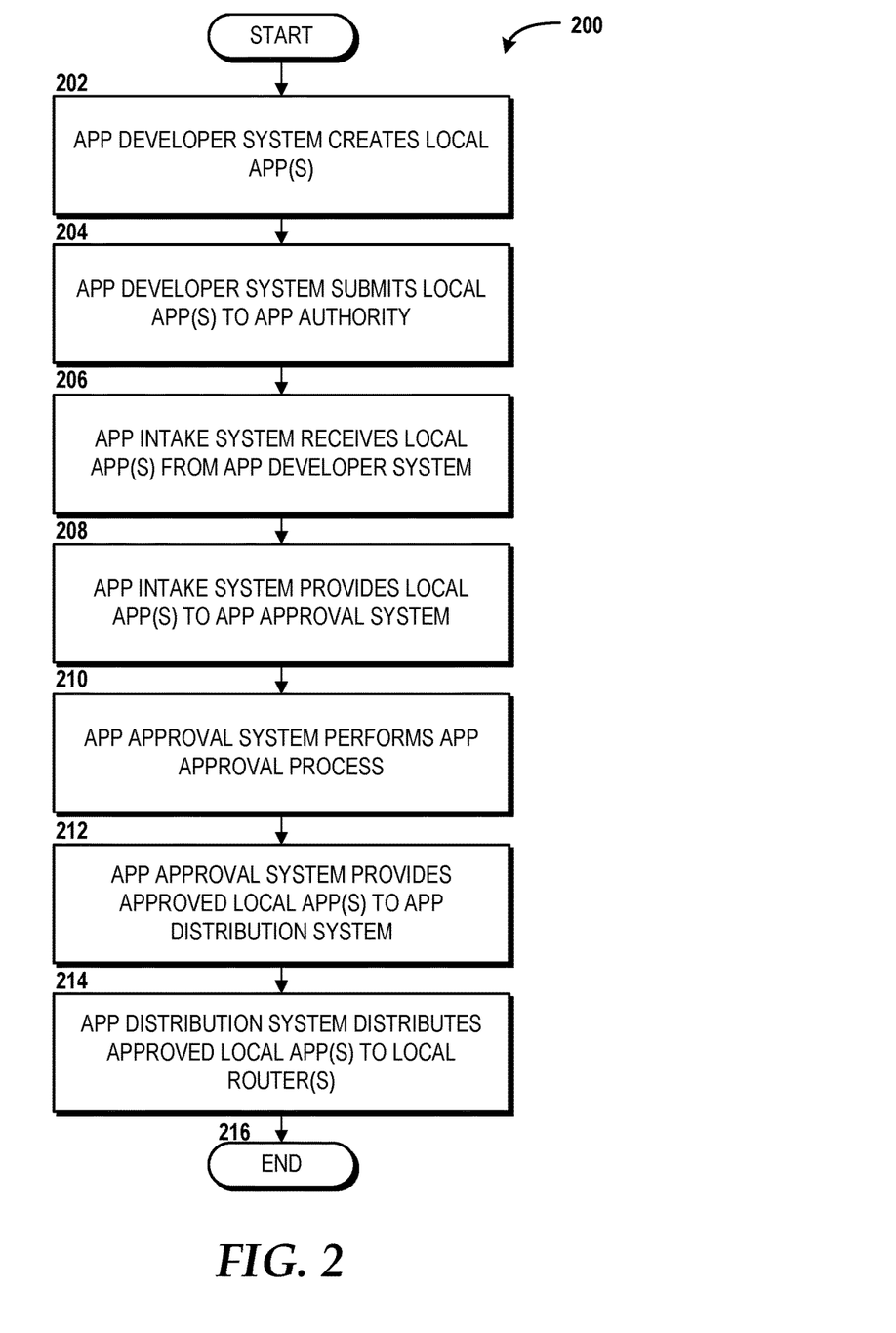
FIG. 2 is a flow diagram illustrating aspects of a method for local application submission, approval, and distribution, according to an illustrative embodiment.

Turning now to FIG. 2, aspects of a method 200 for local app submission, approval, and distribution will be described, according to an illustrative embodiment. It should be understood that the operations of the methods are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in their respective entireties. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including the app developer system(s) 102, the app intake system 110, the app approval system 112, the app distribution system 116, the local router(s) 118, the device(s) 122, single-processor or multiprocessor systems, minicomputers, mainframe computers, personal computers, hand-held computing devices, microprocessor-based, programmable consumer electronics, other devices and systems disclosed herein, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof refers to causing one or more processors to perform one or more operations and/or causing the processor to direct other components of the computing system or device to perform one or more of the operations.

For purposes of illustrating and describing some of the concepts of the present disclosure, the methods disclosed herein are described as being performed, at least in part, by the app developer system(s) 102, the app intake system 110, the app approval system 112, the app distribution system 116, the local router(s) 118, the device(s) 122, or some combination thereof, via execution, by one or more processors, of one or more software modules and/or software applications. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 begins at operation 202, where the app developer system 102 creates the local app(s) 104. From operation 202, the method 200 proceeds to operation 204, where the app developer system 102 submits the local app(s) 104 to the app authority 106. From operation 204, the method 200 proceeds to operation 206, where the app intake system 110 receives the local app(s) 104 from the app developer system 102. From operation 206, the method 200 proceeds to operation 208, where the app intake system 110 provides the local app(s) 104 to the app approval system 112.

From operation 208, the method 200 proceeds to operation 210, where the app approval system 112 performs one or more app approval processes to determine whether the local app(s) 104 should be approved. The app approval processes can include, for example, one or more computer processes that analyze the local app(s) 104 to ensure the local app(s) 104 are reliable, free of malicious software, and/or comply with one or more rules enforced by the app authority 106. It is contemplated that the rules may be changed from time to time to accommodate policy changes based upon feedback from app developers, service providers, customers, government entities, and/or other entities. From operation 210, the method 200 proceeds to operation 212, where the app approval system 112 provides the approved local app(s) 114, if any, to the app distribution system 116.

From operation 212, the method 200 proceeds to operation 214, where the app distribution system 116 distributes the approved local app(s) 114 to the local router(s) 118 via the network 108. From operation 214, the method 200 proceeds to operation 216, where the method 200 ends.

Figure 3:
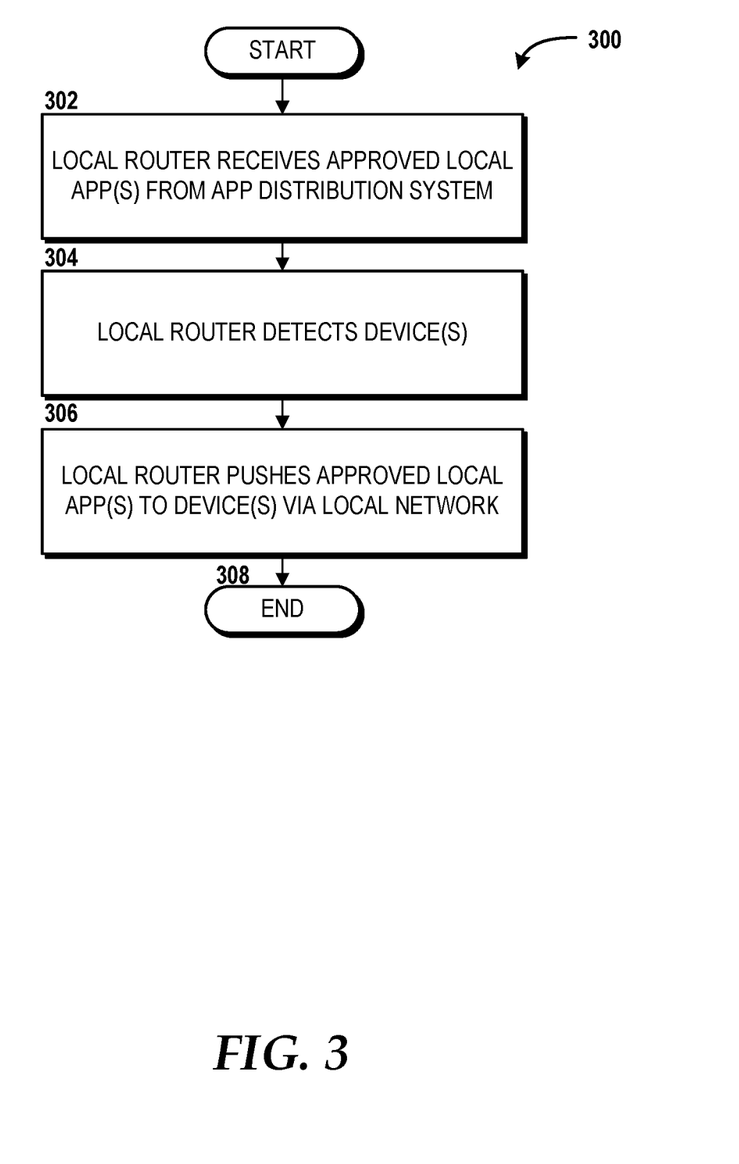
FIG. 3 is a flow diagram illustrating aspects of a method for local application distribution via a local router, according to an illustrative embodiment.

Turning now to FIG. 3, aspects of a method 300 for local app distribution via one of the local routers 118 will be described, according to an illustrative embodiment. The method 300 begins and proceeds to operation 302, where the local router 118 receives the approved local app(s) 114 from the app distribution system 116. From operation 302, the method 300 proceeds to operation 304, where the local router 118 detects one or more of the devices 122. In some embodiments, the local router 118 broadcasts one or more service set identifiers ("SSIDs") that the device(s) 122 can utilize to connect to the local router 118 for access to the local network 124. The local router 118 can detect the device(s) 122 when the device(s) 122 attempt to connect to the local router 118 via an SSID. The local router 118 can detect the device(s) 122 by the devices(s) 122 requesting one or more local apps. In response, at operation 306, the local router 118 pushes the approved local app(s) 114 to the device(s) 122 via the local network 124. From operation 306, the method 300 proceeds to operation 308, where the method 300 ends.

Figure 4:
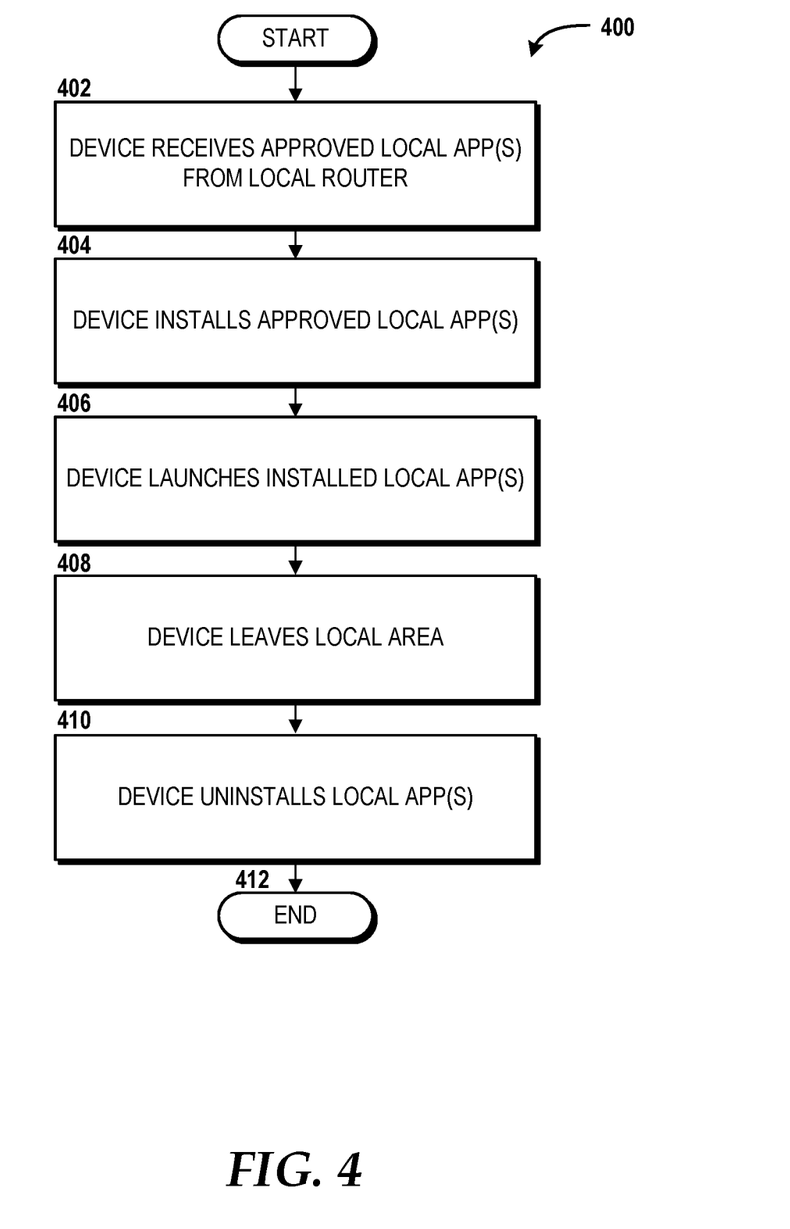
FIG. 4 is a flow diagram illustrating aspects of a method for using a local application, according to an illustrative embodiment.

Turning now to FIG. 4, aspects of a method 400 for using the approved local app(s) 114 will be described, according to an illustrative embodiment. The method 400 begins and proceeds to operation 402, where the device 122 receives the approved local app(s) 114 from the local router 118. From operation 402, the method 400 proceeds to operation 404, where the device 122 installs the approved local app(s) 114. From operation 404, the method 400 proceeds to operation 406, where the device 122 launches the installed local app(s) 126. From operation 406, the method 400 proceeds to operation 408, where the device 122 leaves the local area 120 (shown as the device 122' in FIG. 1). From operation 408, the method 400 proceeds to operation 410, where the device 122 uninstalls the installed local app(s) 126 in response to the device 122 leaving the local area 120. In some embodiments, the installed local app(s) 126 are programmed to automatically uninstall when the local router 118 is no longer within range or the local router 118 is no longer within range for a pre-defined period of time. In some other embodiments, the installed local app(s) 126 are programmed to automatically uninstall when outside the local area 120, the dimensions of which may be defined within the installed local app(s) 126. Whether the device 122 is located within the local area 120 may be determined using any location determining techniques, some example of which include, but are not limited to global positioning system ("GPS"), assisted GPS ("A-GPS"), location beacons, and/or other indoor and/or outdoor location determining techniques. From operation 410, the method 400 proceeds to operation 412, where the method 400 ends.

Figure 5:
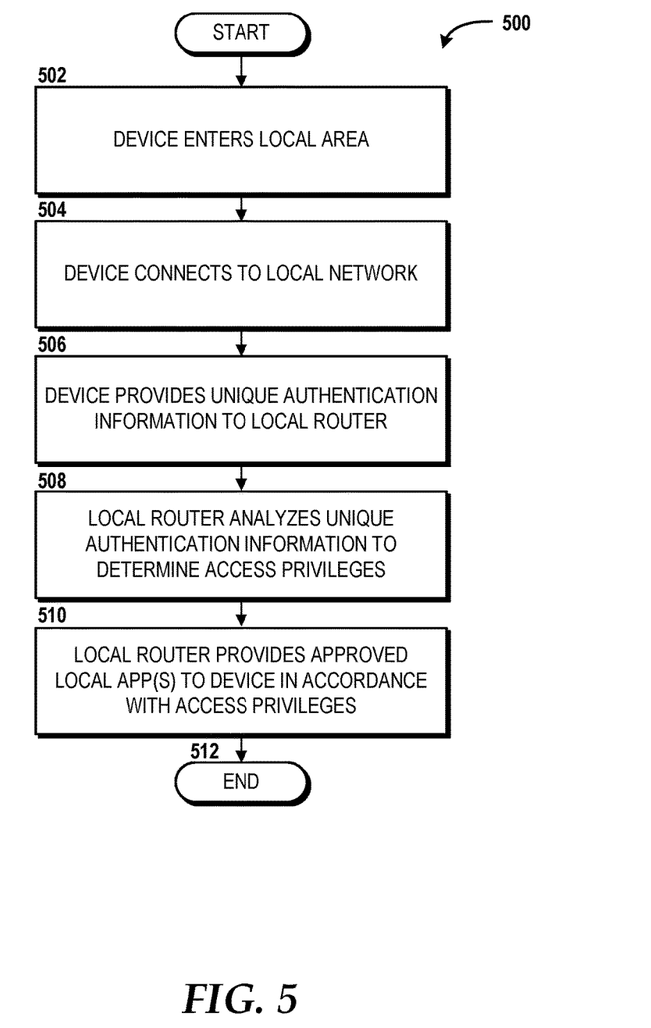
FIG. 5 is a flow diagram illustrating aspects of a method for providing access control to local applications, according to an illustrative embodiment.

Turning now to FIG. 5, aspects of a method 500 for providing access control to local apps will be described, according to an illustrative embodiment. The method 500 begins and proceeds to operation 502, where the device 122 enters the local area 120. From operation 502, the method 500 proceeds to operation 504, where the device 122 connects to the local network 124. From operation 504, the method 500 proceeds to operation 506, where the device 122 provides unique authentication information to the local router 118.

From operation 506, the method 500 proceeds to operation 508, where the local router 118 analyzes the unique authentication information to determine access privileges for the device 122. In other words, the local router 118 can use the unique authentication information to determine whether the device(s) 122 should receive the approved local app(s) 114. The unique authentication information can include username, password, MAC address, IP address, or any other identifier that can uniquely identify each of the device(s) 122 and an associated user. In this manner, the local router(s) 118 can distribute approved local apps 114 based upon access privileges. For example, an employee might have access to a first local app or a first version of a local app that provides access to employee-specific information, whereas a customer might have access to a second local app or a second version of a local app. From operation 508, the method 500 proceeds to operation 510, where the local router 118 provides one or more of the approved local apps 114 to the device 122 in accordance with the access privileges.

From operation 510, the method 500 proceeds to operation 512. The method 500 ends at operation 512.

Figure 6:
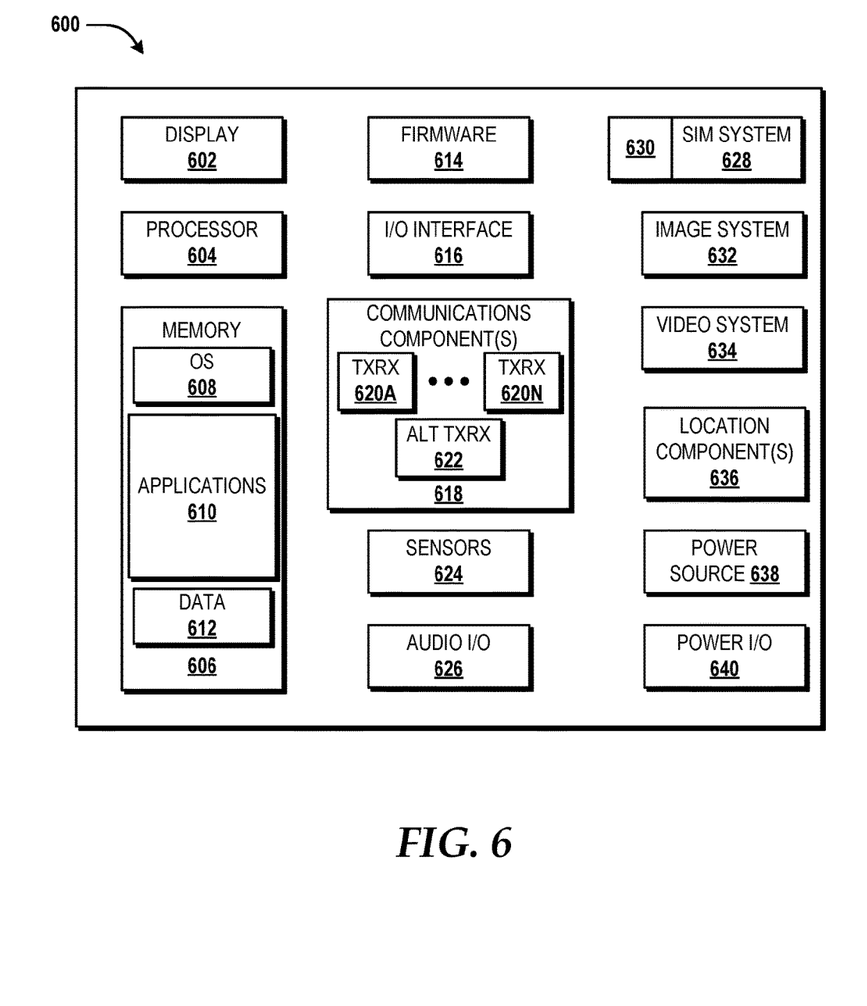
FIG. 6 is a block diagram illustrating an example mobile device capable of implementing aspects of the embodiments disclosed herein.

Turning now to FIG. 6, an illustrative mobile device 600 and components thereof will be described. In some embodiments, the device(s) 122 described above can be configured as and/or can have an architecture similar or identical to the mobile device 600 described herein in FIG. 6. It should be understood, however, that the user device(s) 122 may or may not include the functionality described herein with reference to FIG. 6. While connections are not shown between the various components illustrated in FIG. 6, it should be understood that some, none, or all of the components illustrated in FIG. 6 can be configured to interact with one other to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a display 602 for displaying data. According to various embodiments, the display 602 can be configured to display various graphical user interface ("GUI") elements, text, images, video, advertisements, various prompts, virtual keypads and/or keyboards, messaging data, notification messages, metadata, internet content, device status, time, date, calendar data, device preferences, map and location data, combinations thereof, and the like. The mobile device 600 also can include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608, one or more applications 610 (e.g., the installed local app(s) 126), other computer-executable instructions stored in a memory 606, or the like. In some embodiments, the applications 610 also can include a UI application (not illustrated in FIG. 6).

The UI application can interface with the operating system 608 to facilitate user interaction with functionality and/or data stored at the mobile device 600 and/or stored elsewhere. In some embodiments, the operating system 608 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid a user in entering content, viewing account information, answering/initiating calls, entering/deleting data, entering and setting user IDs and passwords for device access, configuring settings, manipulating address book content and/or settings, multimode interaction, interacting with other applications 610, and otherwise facilitating user interaction with the operating system 608, the applications 610, and/or other types or instances of data 612 that can be stored at the mobile device 600. The data 612 can include user preferences, user settings, and/or other data. The applications 610 can include, for example, the installed local app(s) 126, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 610, the data 612, and/or portions thereof can be stored in the memory 606 and/or in a firmware 614, and can be executed by the processor 604. The firmware 614 also can store code for execution during device power up and power down operations. It can be appreciated that the firmware 614 can be stored in a volatile or non-volatile data storage device including, but not limited to, the memory 606 and/or a portion thereof.

The mobile device 600 also can include an input/output ("I/O") interface 616. The I/O interface 616 can be configured to support the input/output of data such as location information, user information, organization information, presence status information, user IDs, passwords, and application initiation (start-up) requests. In some embodiments, the I/O interface 616 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device.

The mobile device 600 also can include a communications component 618. The communications component 618 can be configured to interface with the processor 604 to facilitate wired and/or wireless communications with one or more networks such as the network 108 described above herein. In some embodiments, other networks include networks that utilize non-cellular wireless technologies such as WI-FI or WiMAX. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments one or more of the transceivers of the communications component 618 may be configured to communicate using GSM, CDMA, CDMAONE, CDMA2000, LTE, and various other 2G, 2.5G, 3G, 4G, and greater generation technology standards. Moreover, the communications component 618 may facilitate communications over various channel access methods (which may or may not be used by the aforementioned standards) including, but not limited to, TDMA, FDMA, W-CDMA, OFDM, SDMA, and the like.

In addition, the communications component 618 may facilitate data communications using Generic Packet Radio Service ("GPRS"), Enhanced Date Rates for GSM Evolution ("EDGE"), the High-Speed Packet Access ("HSPA") protocol family, including High-Speed Downlink Packet Access ("HSDPA"), Enhanced Uplink ("EUL") or otherwise termed High-Speed Uplink Packet Access ("HSUPA"), HSPA+, and various other current and future wireless data access standards. In the illustrated embodiment, the communications component 618 can include a first transceiver ("TxRx") 620A that can operate in a first communications mode (e.g., GSM). The communications component 618 also can include an $N^{th}$ transceiver ("TxRx") 620N that can operate in a second communications mode relative to the first transceiver 620A (e.g., UMTS). While two transceivers 620A-N (hereinafter collectively and/or generically referred to as "transceivers 620") are shown in FIG. 6, it should be appreciated that less than two, two, and/or more than two transceivers 620 can be included in the communications component 618.

The communications component 618 also can include an alternative transceiver ("Alt TxRx") 622 for supporting other types and/or standards of communications. According to various contemplated embodiments, the alternative transceiver 622 can communicate using various communications technologies such as, for example, WI-FI, WiMAX, BLUETOOTH, infrared, infrared data association ("IRDA"), near-field communications ("NFC"), other radio frequency ("RF") technologies, combinations thereof, and the like.

In some embodiments, the communications component 618 also can facilitate reception from terrestrial radio networks, digital satellite radio networks, internet-based radio service networks, combinations thereof, and the like. The communications component 618 can process data from a network such as the network 108 and/or the local network 124, an intranet, a broadband network, a WI-FI hotspot, an Internet service provider ("ISP"), a digital subscriber line ("DSL") provider, a broadband provider, combinations thereof, or the like.

The mobile device 600 also can include one or more sensors 624. The sensors 624 can include temperature sensors, light sensors, air quality sensors, movement sensors, orientation sensors, noise sensors, proximity sensors, or the like. As such, it should be understood that the sensors 624 can include, but are not limited to, accelerometers, magnetometers, gyroscopes, infrared sensors, noise sensors, microphones, combinations thereof, or the like. Additionally, audio capabilities for the mobile device 600 may be provided by an audio I/O component 626. The audio I/O component 626 of the mobile device 600 can include one or more speakers for the output of audio signals, one or more microphones for the collection and/or input of audio signals, and/or other audio input and/or output devices.

The illustrated mobile device 600 also can include a subscriber identity module ("SIM") system 628. The SIM system 628 can include a universal SIM ("USIM"), a universal integrated circuit card ("UICC") and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Because other devices and/or modules for identifying users and/or the mobile device 600 are contemplated, it should be understood that these embodiments are illustrative, and should not be construed as being limiting in any way.

The mobile device 600 also can include an image capture and processing system 632 ("image system"). The image system 632 can be configured to capture or otherwise obtain photos, videos, and/or other visual information. As such, the image system 632 can include cameras, lenses, charge-coupled devices ("CCDs"), combinations thereof, or the like. The mobile device 600 may also include a video system 634. The video system 634 can be configured to capture, process, record, modify, and/or store video content. Photos and videos obtained using the image system 632 and the video system 634, respectively, may be added as message content to a multimedia message service ("MMS") message, email message, and sent to another mobile device. The video and/or photo content also can be shared with other devices via various types of data transfers via wired and/or wireless communication devices as described herein.

The mobile device 600 also can include one or more location components 636. The location components 636 can be configured to send and/or receive signals to determine a geographic location of the mobile device 600. According to various embodiments, the location components 636 can send and/or receive signals from global positioning system ("GPS") devices, assisted-GPS ("A-GPS") devices, WI-FI/WIMAX and/or cellular network triangulation data, combinations thereof, and the like. The location component 636 also can be configured to communicate with the communications component 618 to retrieve triangulation data for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 624 such as a compass, an accelerometer, and/or a gyroscope to determine the orientation of the mobile device 600. Using the location component 636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 also can include a power source 638. The power source 638 can include one or more batteries, power supplies, power cells, and/or other power subsystems including alternating current ("AC") and/or direct current ("DC") power devices. The power source 638 also can interface with an external power system or charging equipment via a power I/O component 640. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

Figure 7:
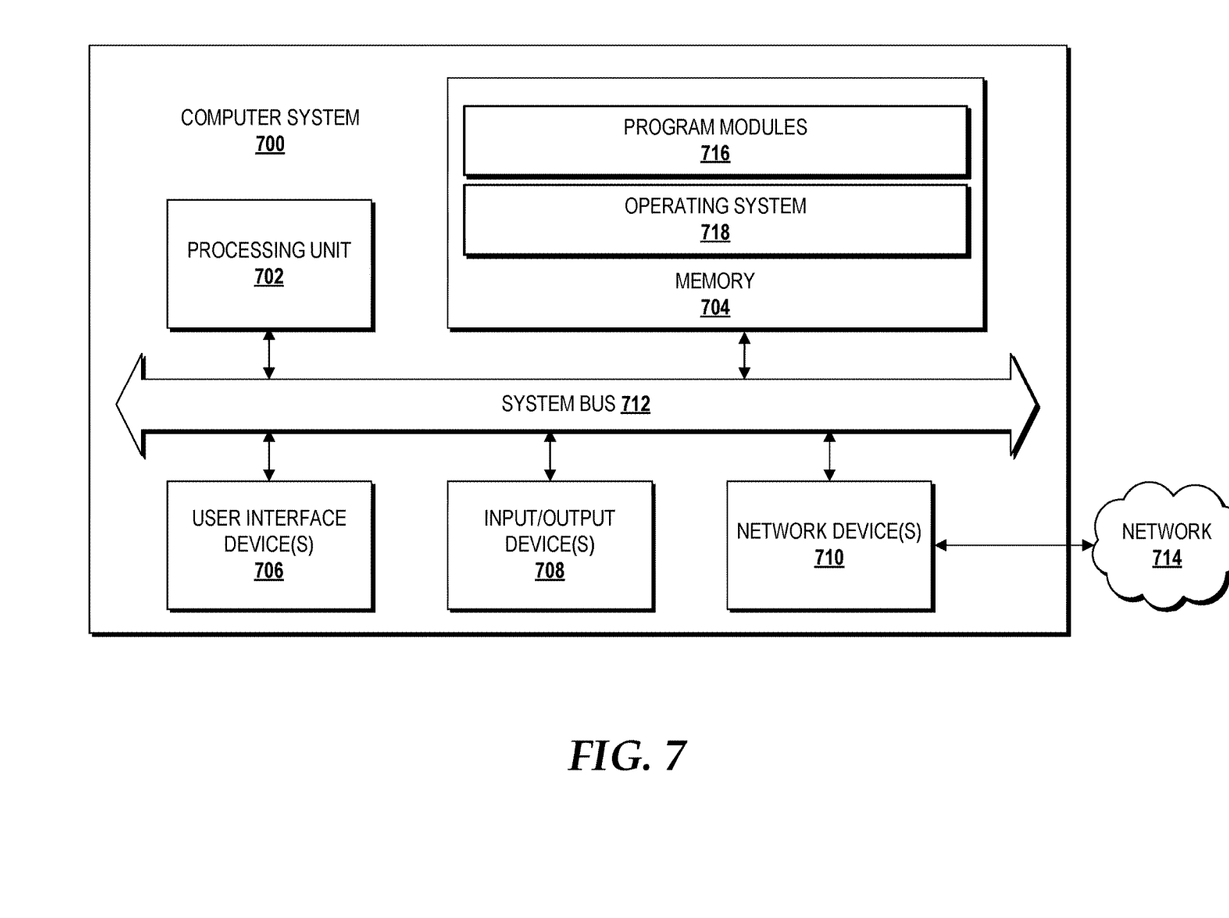
FIG. 7 is a block diagram illustrating an example computer system capable of implementing aspects of the embodiments presented herein.

FIG. 7 is a block diagram illustrating a computer system 700 configured to provide the functionality in accordance with various embodiments of the concepts and technologies disclosed herein. In some implementations, the app developer system(s) 102, the app intake system 110, the app approval system 112, the app distribution system 116, the local router(s) 118, and/or the device(s) 122 are configured to utilize an architecture that is the same as or similar to the architecture of the computer system 700. It should be understood, however, that modification to the architecture may be made to facilitate certain interactions among elements described herein.

The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, a system-on-a-chip, or other type of processor known to those skilled in the art and suitable for controlling the operation of the server computer. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 718 and one or more program modules 716. The operating system 718 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 716 may include various software and/or program modules to perform the various operations described herein. The program modules 716 and/or other programs can be embodied in computer-readable media containing instructions that, when executed by the processing unit 702, perform one or more of the operations described herein. According to embodiments, the program modules 716 may be embodied in hardware, software, firmware, or any combination thereof. The memory 704 can also store other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network 714, such as the network 108 and/or the local network 124. Examples of the network devices 710 include, but are not limited to, a modem, a RF or IR transceiver, a telephonic interface, a bridge, a router, or a network card. The network 714 may include a wireless network such as, but not limited to, a WLAN, a WWAN, a WPAN such as provided via BLUETOOTH technology, a WMAN such as a WiMAX network or metropolitan cellular network. Alternatively, the network 714 may be a wired network such as, but not limited to, a WAN, a wired LAN such as provided via Ethernet, a wired PAN, or a wired MAN.

Figure 8:
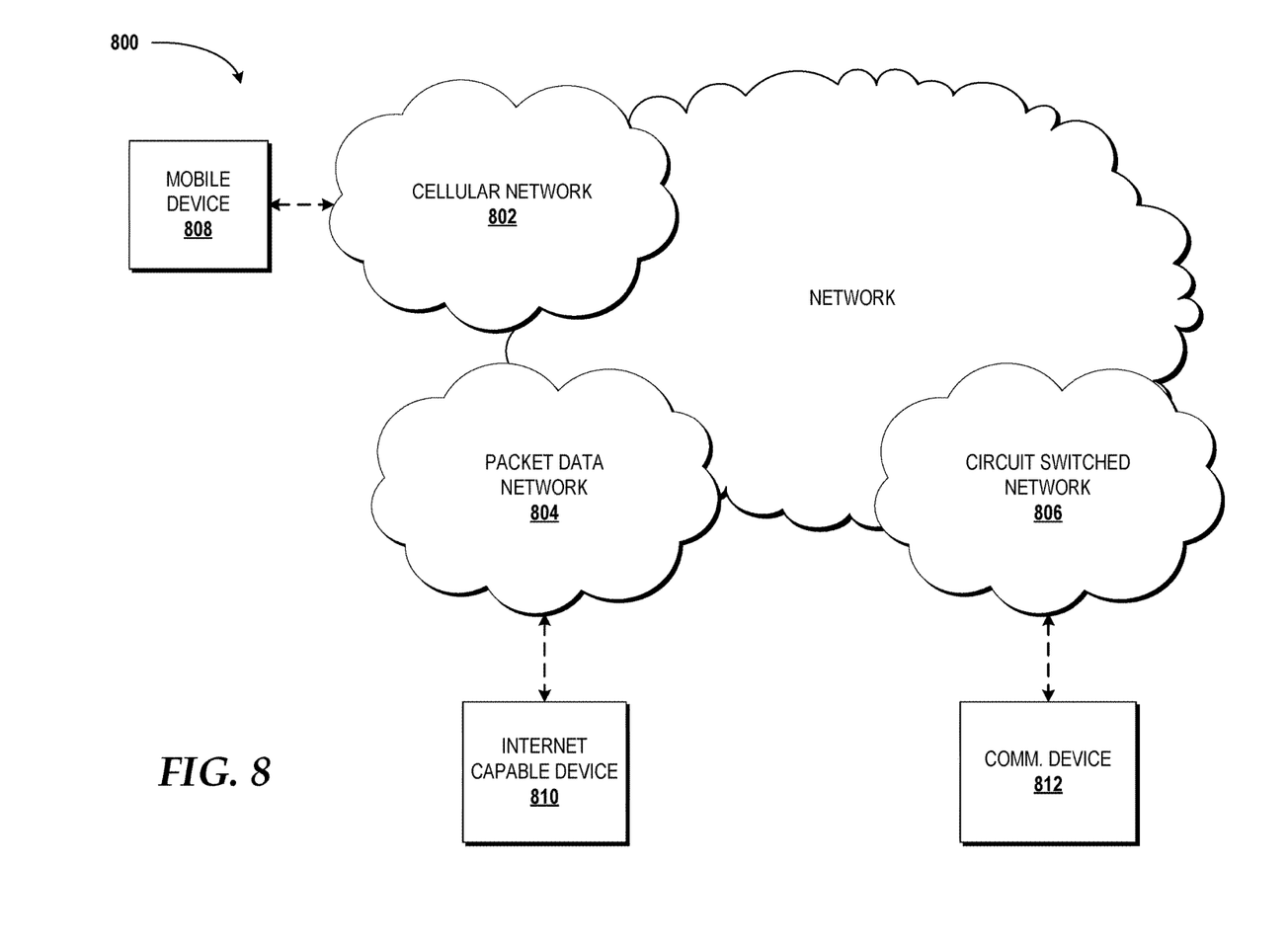
FIG. 8 schematically illustrates a network, according to an illustrative embodiment.

Turning now to FIG. 8, details of a network 800, such as the network 108, will be described, according to an illustrative embodiment. The network 800 includes a cellular network 802, a packet data network 804, for example, the Internet, and a circuit switched network 806, for example, a publicly switched telephone network ("PSTN"). The cellular network 802 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 802 also includes radios and nodes for receiving and transmitting voice, data, and combinations thereof to and from radio transceivers, networks, the packet data network 804, and the circuit switched network 806.

A mobile communications device 808, such as, for example, a cellular telephone, a user equipment, a mobile terminal, a PDA, a laptop computer, a handheld computer, the device(s) 122, and combinations thereof, can be operatively connected to the cellular network 802. The cellular network 802 can be configured as a 2G GSM network and can provide data communications via GPRS and/or EDGE. Additionally, or alternatively, the cellular network 802 can be configured as a 3G UMTS network and can provide data communications via the HSPA protocol family, for example, HSDPA, EUL (also referred to as HSUPA), and HSPA+. The cellular network 802 also is compatible with 4G mobile communications standards such as LTE, or the like, as well as evolved and future mobile standards.

The packet data network 804 includes various devices, for example, servers, computers, databases, and other devices in communication with one another, as is generally known. The packet data network 804 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 804 includes or is in communication with the Internet. The circuit switched network 806 includes various hardware and software for providing circuit switched communications. The circuit switched network 806 may include, or may be, what is often referred to as a plain old telephone system ("POTS"). The functionality of a circuit switched network 806 or other circuit-switched network are generally known and will not be described herein in detail.

The illustrated cellular network 802 is shown in communication with the packet data network 804 and a circuit switched network 806, though it should be appreciated that this is not necessarily the case. One or more Internet-capable devices 810, for example, the device(s) 122, a PC, a laptop, a portable device, or another suitable device, can communicate with one or more cellular networks 802, and devices connected thereto, through the packet data network 804. It also should be appreciated that the Internet-capable device 810 can communicate with the packet data network 804 through the circuit switched network 806, the cellular network 802, and/or via other networks (not illustrated).

As illustrated, a communications device 812, for example, a telephone, facsimile machine, modem, computer, the device(s) 122, or the like, can be in communication with the circuit switched network 806, and therethrough to the packet data network 804 and/or the cellular network 802. It should be appreciated that the communications device 812 can be an Internet-capable device, and can be substantially similar to the Internet-capable device 810.

Based on the foregoing, it should be appreciated that concepts and technologies directed to local applications and local application distribution have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

What is claimed is:

1. A method comprising:
   receiving, by a local router, a local application from an application authority system, wherein the local application is programmed to automatically uninstall when outside of a local area served by the local router, and wherein dimensions of the local area are defined within the local application;
   detecting, by the local router, a device within the local area served by the local router; and
   when the device is detected, providing, by the local router, the local application to the device for use by the device while the device is located within the local area served by the local router, wherein the local application automatically uninstalls from the device when the device leaves the local area.

2. The method of claim 1, further comprising broadcasting, by the local router, a service set identifier that the device can use to connect to the local router.

3. The method of claim 2, wherein detecting the device within the local area served by the local router comprises detecting the device within the local area served by the local router when the device attempts to connect to the local router via the service set identifier broadcast by the local router.

4. The method of claim 1, further comprising:
   requesting unique authentication information from the device; and
   using the unique authentication information to determine whether the device should receive the local application.

5. The method of claim 1, wherein the local application is approved via an application approval process prior to being received by the local router.

6. The method of claim 5, wherein the application approval process comprises an analysis of the local application to ensure the location application complies with a rule enforced by an application authority.

7. The method of claim 6, wherein the analysis further ensures that the local application is reliable and free of malicious software.

8. A local router comprising:
   a processor; and
   a memory that stores instructions that, when executed by the processor, cause the processor to perform operations comprising:

receiving a local application from an application authority system, wherein the local application is programmed to automatically uninstall when outside of a local area served by the local router, and wherein dimensions of the local area are defined within the local application, detecting a device within the local area served by the local router, and when the device is detected, providing the local application to the device for use by the device while the device is located within the local area served by the local router, wherein the local application automatically uninstalls from the device when the device leaves the local area.

9. The local router of claim 8, wherein the operations further comprise broadcasting a service set identifier that the device can use to connect to the local router.

10. The local router of claim 9, wherein detecting the device within the local area served by the local router comprises detecting the device within the local area served by the local router when the device attempts to connect to the local router via the service set identifier broadcast by the local router.

11. The local router of claim 8, wherein the operations further comprise:
   requesting unique authentication information from the device; and
   using the unique authentication information to determine whether the device should receive the local application.

12. The local router of claim 8, wherein the local application is approved via an application approval process prior to being received by the local router.

13. The local router of claim 12, wherein the application approval process comprises an analysis of the local application to ensure the location application complies with a rule enforced by an application authority.

14. The local router of claim 13, wherein the analysis further ensures that the local application is reliable and free of malicious software.

15. A computer storage medium that stores computer-readable instructions that, when executed by a processor of a local router, cause the processor to perform operations comprising:
   receiving a local application from an application authority system, wherein the local application is programmed to automatically uninstall when outside of a local area served by the local router, and wherein dimensions of the local area are defined within the local application;
   detecting a device within the local area served by the local router; and
   when the device is detected, providing the local application to the device for use by the device while the device is located within the local area served by the local router, wherein the local application automatically uninstalls from the device when the device leaves the local area.

16. The computer storage medium of claim 15, wherein the operations further comprise broadcasting a service set identifier that the device can use to connect to the local router.

17. The computer storage medium of claim 16, wherein detecting the device within the local area served by the local router comprises detecting the device within the local area served by the local router when the device attempts to connect to the local router via the service set identifier broadcast by the local router.

18. The computer storage medium of claim 16, wherein the operations further comprise:
   requesting unique authentication information from the device; and
   using the unique authentication information to determine whether the device should receive the local application.

19. The computer storage medium of claim 18, wherein the local application is approved via an application approval process prior to being received by the local router.

20. The computer storage medium of claim 19, wherein the application approval process comprises an analysis of the local application to ensure that the local application is reliable and free of malicious software.

* * * * *